United States Patent [19] [11] 4,244,816
Vogler et al. [45] Jan. 13, 1981

[54] LIQUID MEMBRANE CAPSULE SYSTEMS RESISTANT TO COALESCENCE BY MEANS OF AN IRREVERSIBLE COATING

[75] Inventors: Tina C. Vogler, South Orange; William J. Asher, Fanwood, both of N.J.

[73] Assignee: Exxon Research & Engineering Co., Florham Park, N.J.

[21] Appl. No.: 5,353

[22] Filed: Jan. 22, 1979

Related U.S. Application Data

[63] Continuation-in-part of Ser. No. 874,245, Feb. 1, 1978, abandoned.

[51] Int. Cl.³ ............... B01D 31/00; B01D 13/00; A61M 1/03
[52] U.S. Cl. ............... 210/638; 128/213 A; 210/643; 252/352; 210/646; 210/648; 210/321.3
[58] Field of Search ............... 252/352; 210/21, 22 A, 210/22 R, 22 O, 321 A, 321 B, 321 R, 23 H, 23 F, 433 M, 24, DIG. 23; 128/213 A

[56] References Cited

U.S. PATENT DOCUMENTS

| | | | |
|---|---|---|---|
| 2,773,027 | 12/1956 | Powers | 210/321 A X |
| 3,608,729 | 9/1971 | Haselden | 210/321 B |
| 3,703,959 | 11/1972 | Raymond | 210/321 B X |
| 3,714,063 | 1/1973 | Salomone | 252/352 X |
| 3,825,493 | 7/1974 | Brown et al. | 210/23 H |
| 3,969,265 | 7/1976 | Singhal et al. | 210/21 X |
| 4,014,785 | 3/1977 | Li et al. | 210/21 X |

FOREIGN PATENT DOCUMENTS 2334230  1/1975  Fed. Rep. of Germany ......... 210/23 F

*Primary Examiner*—Frank A. Spear, Jr.
*Attorney, Agent, or Firm*—J. J. Allocca; Edward M. Corcoran

[57] ABSTRACT

The instant invention relates to liquid membrane capsule system (LMCS) which are made resistant to coalescence by means of an irreversible coating material present in the suspension phase. LMCS having this irreversible coating material are stable (i.e. resist coalescence) over relatively long periods of time with little or no applied agitation. These irreversibly coated LMCS can be pumped for long periods, are resistant to bile, pancreatin and solid matter and maintain their initial size distribution.

The instant invention relates to methods of preparing the irreversibly coated LMCS.

The LMCS of the instant invention exhibit resistance to rupture during pumping and passage over packing materials, such as glass beads or charcoal, thus making them of use in medical treatment processes such as renal dialysis and in the equipment used for such processes.

33 Claims, 2 Drawing Figures

LIQUID MEMBRANE CAPSULE SYSTEMS RESISTANT TO COALESCENCE BY MEANS OF AN IRREVERSIBLE COATING

CROSS-REFERENCE TO RELATED APPLICATIONS

This application is a continuation-in-part of Ser. No. 874,245 filed Feb. 1, 1978, now abandoned.

BRIEF DESCRIPTION OF THE INVENTION

The instant invention relates to liquid membrane capsule systems which have been made resistant to coalescence by means of an irreversible coating which coating is typified by sodium carboxymethyl cellulose and aluminum sulfate added to an emulsion-suspension system resulting in irreversibly coated globules containing both the emulsion, comprising an internal and external phase, and the suspension phase. As a result of this irreversible coating the liquid membrane systems will maintain their initial size distribution for a long period of time in the absence of agitation. Furthermore, the liquid membrane capsule systems will be pumpable for extended periods of time. The liquid membrane systems will also be resistant to rupture caused by bile, high HLB surfactant (13 or greater), stress pancreatin or solid matter. Such irreversibly coated liquid membrane capsule systems will be of advantage in medicinal fields where it is desirable to have high stability liquid membrane systems encapsulating detoxification chemicals as the internal phase of the liquid membrane. These liquid membrane capsule systems will be particularly useful for extracorporeal medical treatment. Such irreversibly coated liquid membrane capsule systems will also be of use in detoxification and water purification systems wherein strong, long-lived encapsulated materials are desirable for the concentration of toxins or wastes wherein the handling will not be as gentle as that which can be performed under laboratory conditions, i.e. irreversibly coated liquid membrane capsule systems will be of use in general industrial applications.

Extracorporeal Use of Stabilized LMC

One of the most attractive uses of these stabilized LMC is the treatment of patients with the LMC in an extracorporeal device containing these LMCs. An extracorporeal device is, of course, outside the body but in communication with the patient via a body fluid. In chronic uremia, the most common extracorporeal treatment is hemodialysis. Here blood is removed from the patient and passed through the hemodializer before returning to the patient. In the device, the blood passes on one side of a solid dialysis membrane and on the other side of this membrane a large volume of dialysis fluid (i.e. about 200 liters) is used to dilute the toxins from the blood. The volume of dialysis fluid required might be greatly reduced (i.e. to about 1 liter) by continuously removing toxins with the stabilized LMC suspended in a recirculating dialysis fluid. The volume of dialysis fluid can be reduced by about 99%.

A newer type extracorporeal treatment is hemofiltration. Here the blood is ultrafiltered, the ultrafiltrate discarded and sterile saline is reinfused into the patient. Here the requirement for large volumes of sterile saline could be eliminated by treating the ultrafiltrate with LMC to remove the toxins and reinfusing the treated ultrafiltrate. Of course, the LMC would have to be removed from the ultrafiltrate by, for example, gravity settling and/or filtration, before reinfusion into the patient.

A type of extracorporeal treatment under experimental investigation is hemoperfusion. Here the blood removed from the patient is directly treated with sorbents before reinfusion. These LMCs might be used to remove the toxins from the blood by suspending the LMC directly in the blood. Of course, they would have to be removed before reinfusion.

An additional type of dialysis in extensive clinical use is peritoneal dialysis. In this method, sterile fluid is introduced into the peritoneal cavity, where it is separated from the blood by the natural peritoneal membrane, and is used to dilute the toxins. This fluid is later drained from the cavity and discarded and replaced by additional sterile fluid. The volume of sterile fluid could be greatly reduced by an extracorporeal device to treat the fluid drained from the peritoneal cavity with suspended LMC before reinfusing the purified fluid. It is preferred that the LMC be removed from the fluid before reinfusion. However, if LMCs which were completely degraded by the body were used, this complete removal would not be essential. The Stabilized Liquid Membrane Capsules (LMC) of the present invention make possible very significant improvements in the various apparatus employed in the dialysis of blood. Hemodialysis apparatus are improved and significantly reduced in size by using the LMC. The volume of dialysis fluid employed can be reduced by over 99% since rather than using a large volume of dialysis fluid to dilute the toxins picked up, the LMC captures the toxin or converted toxin (ammonia) and carries it off in a small volume. This is accomplished by using means for suspending the LMC wherein the interior phase is citric acid, in the dialysis fluid which, by means of urease has converted urea into ammonia. The LMC removes the ammonia. The combination of dialysis fluid and LMC are passed into a contacting zone wherein they encounter activated carbon and phosphate ion exchange materials to remove other toxins. The dialysis fluid and suspended LMC may then be separated by standard means such as filtration, settling, etc., the purified small volume of dialysis fluid being recirculated to contact the blood, while the LMC goes to treat another volume of dialysis fluid. This separation is purely optional. Clearly the apparatus can function on either a batch or continuous basis.

In peritoneal dialysis, the saline solution is purified using the LMC wherein the interior phase is citric acid by employing means for suspending the LMC in the contaminated saline withdrawn from the peritoneal cavity. This combination is contacted in a contacting zone with immobilized urease, which converts urea to ammonia (which in turn is removed by the LMC), activated carbon and phosphate ion exchange material to remove the toxins and suspended matter. The saline and LMC are then separated in a separating means. The purified saline being recycled to the peritoneal cavity and the LMC being used to cleanse another portion of saline.

Likewise, in hemofiltration, the ultrafiltrate containing the toxins has suspended in it the LMC, again containing citric acid, and this combination passed to, i.e., contacting means wherein it contacts immobilized urease, activated carbon and phosphate ion exchange material. In much the same way as peritoneal dialysis, the ultrafiltrate is cleansed of the ammonia and other toxins, separated from the LMC and reintroduced into the blood thereby eliminating the need to use saline and thus also reintroducing into the body its own cleansed plasma containing the essential components which are beneficial to the patient.

The irreversibly coated, coalescence resistant liquid membrane capsule systems of the instant invention will find primary use in medicinal applications, for example, in the treatment of chronic uremia as a valuable adjunct to dialysis. In such a medicinal use, liquid membrane capsule systems which have been irreversibly coated will comprise an internal aqueous phase containing a reactive substance such as a medicinal, toxin trap or an enzyme, for example, urease. The external phase will comprise an oil layer to which has been added a strengthening agent and/or a surfactant. This internal-/external phase droplet (emulsion) will in turn be suspended in a suspending phase, typically a saline type medically acceptable solution. Each of these internal-/external droplets-suspension phase materials will in turn be encapsulated by the irreversible coating system of the instant invention thereby rendering large portions of the liquid membrane capsule systems resistant to coalescence.

Figure 1:
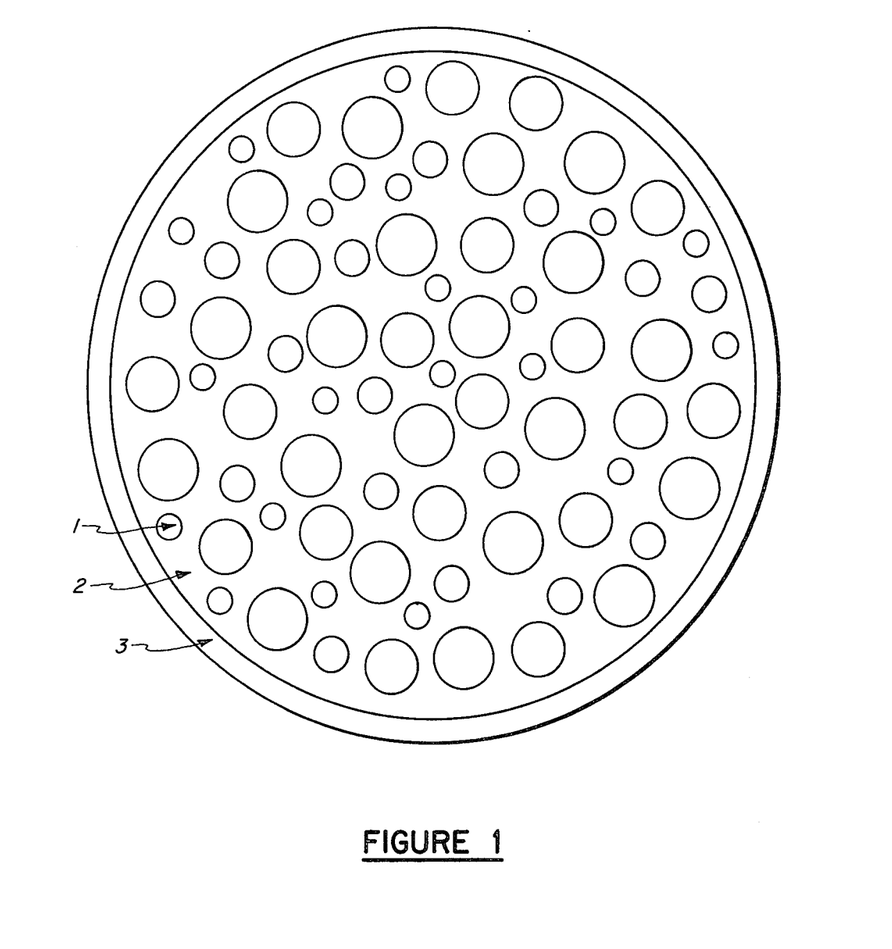
FIG. 1 is a highly simplified schematic of the invention of the instant application showing the irreversible coating external layer, the continuous emulsion phase contained inside the coating layer, i.e. the micro droplets comprising an internal phase suspended in the continuous external phase.

In the practice of the instant invention, the micro droplets identified as No. 1 in the Figure will be formed by any means common in the art, i.e. dropwise addition of the internal phase material to the oil phase with appropriate agitation. The encapsulating phase will be a hydrocarbon oil phase which, if the application of the encapsulated system is medicinal, will be nontoxic. The same is true for the strengthening agents and/or surfactants which are used in the practice of this invention. The internal phase will contain the reactive substrate and can be chosen from those substances which either complex with permeated toxin thereby rendering it impermeable to retransfer across the external phase boundary, or will react with the toxin thereby rendering it nontoxic. The suspension phase will be present so as to dilute the liquid membrane system thereby rendering it amenable to injection or ingestion as the case may be. The choice of the suspension system is left to the discretion of the practitioner, subject to the constraints enumerated later, as is the concentration of the emulsion in the suspension phase, since such parameters are dependent upon the use to which it is to be put. In those situations wherein the liquid membrane capsule system is to be used in a medicinal form, the suspension phase of course must be nontoxic and will preferably constitute a saline type solution.

DETAILED DESCRIPTION OF THE INVENTION

Liquid membrane compositions comprising an aqueous internal phase surrounded by a nonaqueous hydrophobic oil external phase suspended in an aqueous suspension media are rendered resistant to coalescence by the inclusion of an irreversible coating material in the suspension media phase. The liquid membrane compositions in general comprise an aqueous internal phase. The aqueous internal phase may contain any material which can be suspended or dissolved in an aqueous media. In general, the aqueous phase solution may contain from 0 to 60% solute or from 0 to the saturation point of the solute. Preferably, the aqueous internal phase is a dilute solution, that is, of less than 10% solute. The composition of the material in the aqueous phase is left to the discretion of the practitioner. As such, the aqueous internal phase can comprise plain water if such is desirable or it may contain an acid or base material or it may contain a suspended medicinal or enzyme or toxin trap if the overall liquid membrane is intended for medical purposes.

When the material in the aqueous internal phase is an acid, the concentration range is from 0 to the saturation point. Such materials containing an acid or base internal or aqueous phase are normally utilized in water decontamination processes. This aqueous internal phase is in turn encapsulated by an external phase comprising an hydrophobic nonaqueous oil phase. Again, the composition of the oil phase is left to the discretion of the practitioner, the ultimate composition depending upon the use to which the liquid membrane composition is to be placed. If the liquid membrane composition is to be used for medicinal purposes, obviously the oil external phase components must be nontoxic.

The oil is designed to be immiscible with the liquids present in the environment of use, for example, in the G.I. tract. The oil is also to be immiscible with the ultimate suspension phase to be described in further detail later. Normally, the polynuclear aromatic oils are known to be harmful to the body and consequently are outside the scope of this application when the materials are to be used for medicinal purposes and/or ingested or injected into the human body.

Some nonlimiting examples of oils which can be utilized in forming the compositions of the instant invention for use in the body include hydrocarbon oils that are refined to remove toxic ingredients and possess molecular weights up to 1000, for example, paraffins, isoparaffins, naphthenes and nonpolynuclear aromatics. Particularly desirable are the mineral oils which have been highly refined for use in human ingestion. A 1 to 60% mono-olein-mineral oil blend can also be used. Additionally, oil or treated oils from animal or vegetable sources may be used if they are unconverted in the environment of use. For example, vegetable oil and animal fats that are heavily hydrogenated to contain at least 10 wt. % more hydrogen than at normal saturation may be used herein. Furthermore, silicon fluids containing the repeating unit can be used. The fluorinated hydrocarbon oils may also be used. Any of these oils should have a viscosity of about 1 to a 1000 centistokes at the temperatures at which they are utilized. The preferred range is about 1 to 130 centistokes at approximately 100° F. Most preferably, the materials have a viscosity of 9 to 17 centistokes. Mineral oils are the most preferred oil phase components. For general applications, the oil external phase comprises material which is immiscible with the aqueous internal phase and which will not react with the aqueous phase or the components of the aqueous phase or with the suspension phase. This oil external phase has dissolved therein optionally, a surfactant. In general, the surfactants have HLB ranges of 4 to 5.5. The most preferred HLB range is 4.2 to 4.4. In general, the amount of surfactant utilized ranges from 0 to 5 wt. %. Ideally, the amount of surfactant utilized is zero if the material used for coating is carboxymethyl cellulose. In addition, the oil external phase must contain a strengthening agent. The amount of strengthening agent used in general, ranges from 0.5 to 40 wt. %, preferably 2 to 10 wt. %. Ideally, the same material will be utilized as both the surfactant and strengthening agent.

Surfactants which may be utilized in the invention are those known in the art; see, for example, U.S. Pat. No. 3,779,907. A detailed treatis on surfactants is *Surface Active Agents and Detergents* by Schwartz, Perry and Berch, Interscience Publishers, Inc., New York, N.Y., and *Surface Chemistry* by Osipow, Reinhold Publishing Company, New York, N.Y., 1962, Chapter 8. The only requirement which must be met is that the surfactant be oil soluble, i.e., an HLB of $\leq 8$.

Various polyamine derivatives which function both as surfactants and strengthening agents, are useful within the scope of the instant invention. The preferred polyamine derivatives are those having the general formula:

wherein $R_3$, $R_4[R_5, R_6, R_7, R_8, R_9]$ and y are chosen from the group consisting of hydrogen, $C_1$ to $C_{20}$ alkyl, $C_6$ to $C_{20}$ aryl, $C_7$ to $C_{20}$ alkaryl radicals and substituted derivatives thereof; and x is an integer of from 1 to 100. More preferably, $R_5$, $R_6$, $R_7$, $R_8$ and $R_9$ are hydrogen, and x varies from 3 to 20. y may be further selected from the group consisting of hydrogen containing nitrogen radicals, hydrogen and oxygen containing nitrogen radicals and alkyl radical having up to 10 carbons which contain nitrogen, oxygen or both. The substituted derivatives previously mentioned are preferably selected from the group consisting of oxygen, nitrogen, sulfur, phosphorus and halogen containing derivatives.

Other polyamine derivatives which are useful are polyisobutylene succinic anhydride derivatives selected from the group consisting of compounds of the structure wherein R' is a $C_{10}$–$C_{60}$ hydrocarbon.

The most preferred polyamine derivatives have the general formula (a)

When the LMCs are to be utilized in medicinal applications, especially when injected or ingested, the surfactants, if used, must not be harmful to the human body. Nonionic surfactants are the preferred surfactant types for the practice of this aspect of the invention. A surfactant is nonionic if it does not ionize when added to the aqueous phase that will be the suspending phase or the internal aqueous phase.

Examples of oil-soluble surfactants possessing the desired characteristics include sorbitan monooleate and other types of sorbitan fatty acid esters, e.g., sorbitan, sorbitanmonolaurate, sorbitan monopalmitate, sorbitan stearate, sorbitan tristearate, sorbitan trioleate, poly oxyethylene sorbitan, fatty acid esters, and mono and diglycerides. Preferred surfactants include the polyamine derivatives previously described.

This internal aqueous phase/external oil phase emulsion is in turn suspended in a suspension phase which is an aqueous material. The composition of this suspended aqueous phase material is again left to the discretion of the practitioner. In general, when the liquid membrane compositions are intended for medicinal uses, the aqueous suspending phase must be nontoxic and in general will constitute a medically acceptable saline solution. For other applications, this aqueous suspending phase may contain any useful component. The amount of suspending phase to emulsion represented as Vs/Ve (Volume suspending to volume emulsion) ranges from L;L to 5:1 with the preferred ratio ranging from 2:1 to 3:1.

This overall emulsion containing suspension is rendered resistant to coalescence by the addition of materials of the type represented by sodium carboxymethyl cellulose to which has optionally been added a trivalent metal salt component or heavy divalent metal salt of the type represented by aluminum sulfate.

The compositions of the instant invention are resistant to coalescence, that is, the coated liquid membrane compositions when allowed to stand in a container which is not being subjected to agitation will not coalesce, that is, will not significantly deteriorate in particle droplet size, said deterioration being characterized by an increase in the overall size of each LMC droplet. Coalescence can be broken down into three different ranges. They are severe coalescence in which is observed two distinct phases at the time of inspection. One phase constitutes the aqueous internal and the nonaqueous external phase emulsion completely distinct from the suspending phase at the time of inspection. The next level constitutes minimal coalescence. At the time of inspection, the liquid membranes are identifiable as distinct phases; that is, the internal aqueous-external nonaqueous emulsion component is seen to still be in suspension. However, there is recognized at the time of inspection a change in the size distribution. A broadening of the size range by a factor of 3 is seen. For example, if at time zero, that is, upon immediate cessation of agitation, the liquid membrane composition exhibits a size range of from X to 3X with an average size of 1.3 X, while at the time of inspection, some arbitrary time after t=o, the size range goes from X to 10X with the average size being 1.7X to 2.1X which constitutes a 30 to 60% increase in the average size. X is defined as the smallest liquid membrane particle typically 5 to 50μ.

In general, formulations exhibiting minimal coalescence at the time of inspection exhibit negligible coalescence for some length of time before the inspection time.

Negligible coalescense is the final category and in order to exhibit negligible coalescence, liquid membrane capsules at the time of inspection exist as distinct materials; that is, the emulsion has remained in suspension with a minimal change in average particle size and particle distribution. No broadening of size range is seen. For example, if at time 0, the size distribution ranges from X to 3X with an average of 1.3X, while at the inspection time, some arbitrary time after time 0, the size range ranges from X to 3X, with an average size of 1.7X. Negligible coalescence is identified as no change in the size range of the liquid membrane capsules with less than a 30% change in the average size.

Non-irreversibly coated, prior art liquid membranes exhibit severe coalescence in one minute to one hour. Some formulations of irreversibly coated liquid membranes exhibit minimal coalescence over a time span of from two hours to two years. Other formulations of irreversibly coated liquid membranes exhibit only negligible coalescence after 1 year or more of standing. The irreversibly coated liquid membrane compositions of the instant invention, can also be characterized by the following test criteria.

Emulsions suspended in a suspension phase were coated with a preselected coating material. These irreversibly coated liquid membrane compositions were then exposed to a suspending phase which contained a high HLB surfactant (HLB greater than 8, for example, bile or Renex 690) and/or solids (0.03 to 0.07% pancreatin, silica gel) with gentle agitation (a propeller mechanism stirring at 30 to 60 rpm). Under these test criteria, severe coalescence constituted an increase in average liquid membrane size ranging to five times the original liquid membrane size in from 5 to 15 minutes. Visual observation indicated that the material after that time period contained some nonspherical shaped liquid membranes. Noncoated liquid prior art membrane compositions subjected to the test criteria coalesced to form separate emulsion-suspension phases within one minute after the cessation of agitation. Minimal coalescence under the test conditions are described by the following change in size distribution which occurs gradually over a two-hour period. Here, as before, a broadening of the size range by a factor of three is seen, but this time at a time of two hours of continuous exposure to high HLB surfactant and/or solids as described before. For example, if at time=0 the size ranges from X to 3X with an average size of 1.3X, at a time of two hours, the average size ranges from X to 10X with an average size of 1.7X to 2.1 X (a 30 to 60% increase in size) X=the smallest liquid membrane capsule size. In order to be considered to exhibit minimal coalescence, liquid membranes will coalesce to form separate emulsion and suspension phases within 1 day after cessation of agitation. For a liquid membrane to exhibit negligible coalescence under the test conditions, size range of the liquid membrane is maintained as before with less than a 30% increase in the average diameter in the liquid membrane capsule average diameter but this time in two hours. In order for a liquid membrane capsule to exhibit minimal coalescence, liquid membranes will separate on visual inspection into emulsion and suspending phases only after more than one day without agitation. The irreversibly coated liquid membrane compositions of the instant invention when subjected to the test criteria fall into the latter two categories.

The irreversibly coated liquid membrane compositions of the instant invention are generally prepared by encapsulating the aqueous interior phase component in the nonaqueous external oil phase component by mixing the two materials at a shear rate, for example, of from 500 to 8000 reciprocal seconds (sec$^{-1}$). This emulsion in turn is suspended in a suspending phase by the addition of the emulsion to the suspension phase and exertion of a shear rate of 50 to 8000 reciprocal seconds for a duration of from 0.5 to 150 seconds per 100 grams total material (the suspending phase plus emulsion). When using high shear rates (i.e. >1000 sec$^{-1}$), the emulsion micro droplet size must be $\leq 1\mu$ to avoid excessive leakage during the coating process. The suspending phase has added to it before the preparation of the liquid membrane compositions a quantity of irreversible coating materials such as sodium carboxymethyl cellulose which is characterized by a molecular weight of from 80,000 to 800,000. Preferably, the sodium carboxymethyl cellulose is of the lower viscosity type with a molecular weight of from 80,000 to 200,000. As an alternative to sodium carboxymethyl cellulose as one of the irreversibly coating components may be used albumin or hydroxypropyl cellulose or xanthum gum (a polysaccharide). As further alternates to these materials, there may be used long chain polymers having surface activity; that is, those polymers used commercially as emulsion stabilizers, which have the ability to gel or have their chains crosslinked by the action of the trivalent/heavy divalent cations. After the formation of this liquid membrane composition comprising an emulsion in water combination wherein the final water phase contains the irreversibly coating material which for the sake of convenience will be identified as sodium carboxymethyl cellulose there is added an additional material constituting a trivalent metal salt or heavy divalent metal salt.

As examples of such salts, one may consider $Al_2(SO_4)_3.18H_2O$, aluminum acetate or aluminum hydroxide may be used. Further, any trivalent cation containing salt or heavy metal divalent cation, for example, cuprous, cupric, silver, ferrous, uranic, chromium, stannous, lead or zirconium materials may also be used. This trivalent heavy divalent cation shall for the sake of convenience, be identified as aluminum sulfate. The amount of aluminum material added to the liquid membrane composition is determined on the basis of the ratio of the cellulose component weight to the aluminum cation weight. Preferably, the ratio ranges from 50 to 999, preferably from 70 to 200. The typical pH of the cellulose material in water is aout 5.5. This pH may be adjusted higher, to about 8.0 by addition of a base, such as $NaHCO_3$ or NaOH. The manner of the addition of the aluminum material is of importance. When aluminum sulfate is added as a solid, it is added to the suspending phase before the emulsion has been suspended in the suspending phase, that is, before the liquid membrane capsules are formed. If the aluminum sulfate is added from aqueous solution, again the material is added dropwise to the irreversible coating component containing the suspending phase before the liquid membrane composition is formed. In this case, the suspending phase (containing cellulose material and Al) will have a pH of 3.0-5.5, regardless of whether the pH of the suspending phase (containing only cellulose material) was adjusted as far as up to 8 before the Al was added or not. When Al is added in this manner, best results are obtained when the emulsion and suspending phases are subjected to shear rates of from 4000 to 5000 seconds$^{-1}$ for from 0.8 to 1.3 sec. per 100 gms.

In another embodiment, citric acid or some other acid such as any alkali metal salt of citric or maleic acid or short chain carboxylic acid or metal salt acids is added to a solution containing the aluminum sulfate materail, with the pH of the acid-Al solution having been adjusted to 2 to 7, and the solution is added after the liquid membrane capsules have been formed. The pH of this cation containing material which is added after the liquid membrane is formed is preferably adjusted to from 5 to 7 by the addition of sodium hydroxide. Typically, when the aluminum sulfate is added from a citric acid solution, the mole ratio of citrate as citric acid to aluminum ranges from 0:1-1:1, preferably the mole ratio is 0.6:1-1:1. When this embodiment is used, the shear rate for forming the LMC is preferably 70-700 sec$^{-1}$ for a duration of 1-150 sec/100 gms. material (suspending phase +emulsion). The citric acid-Al sulfate is added over a period of 1-5 min. after the LMC have formed while the LMC are being sheared at a rate 5-40% of that used to form the LMC.

To summarize, the irreversibly coated LMC composition comprises an emulsion, comprising an aqueous internal-nonaqueous external phase, in an aqueous suspending phase, which aqueous suspending phase has added to it an irreversible coating component, present at a concentration of from 0.5 to 100 grams ICC per liter suspending phase, preferably 1 to 50 grams ICC per liter suspending phase. To this is added, optionally a heavy tri or divalent metal salt at an ICC to salt rates based on weight, of from 50 to 999. The typical pH of the ICC containing suspension phase is about 5.5. When the trivalent or heavy divalent cation salt material is added from solution, the salt is preferably dissolved in an acidic solution, the pH of which is between about 2 and 7, preferably between about 5 and 7. In such a situation the mole ratio of acid to trivalent or heavy divalent cation salt ranges from 0:1 to 1:1, preferably 0.6:1 to 1:1.

Following are examples of irreversibly coated LMC, the method of preparing them and the stability observed when left to stand with no agitation.

TABLE I

| | | | Suspending Phase Characteristics | | | |
|---|---|---|---|---|---|---|
| Ex | Emulsion Oil Phase | Composition Internal Phase | Conc., type of long Chain Polymer | pH of Suspending Phase | Components of Suspending Phase (In addition to long chain polymer) | Ratio of Suspending Phase to Emulsion |
| 1 | 96% Markol 87* 4% Polyamine A | 60.9% citric ↓ | Sodium Carboxy 20 g/l Methyl Cellulose Low vis type | 5.5 ↓ | — | 2:1 |
| 2 | ↓ | ↓ | ↓ | ↓ | — | 2:1 |
| 3 | ↓ | ↓ | 10 g/l | ↓ | — | 2:1 |
| 4 | ↓ | 5 g/l NaCl 4 g/l NaHCO$_3$ | 20 g/l | ↓ | — | 2:1 |
| 5 | 96% Markol 87* 4% Polyamine A | 69.9% citric acid | 5.0 g/l | ↓ | — | 1:1 |
| 6 | ↓ | ↓ | 10 g/l | 7.7 | 20 g/l NaHCO$_3$ | 2:1 |
| 7 | 96% Markol 87* 4% Polyamine A | 59.2 wt. % tartaracid ↓ | 10 g/l Sodium Carboxy-methyl Cellulose (low viscosity type) | 7.7 ↓ | 20 g NaHCO$_3$/l 1.5 g Al$_2$(SO$_4$)$_3$ 18 H$_2$O/l | 2:1 ↓ |
| 8 | 95% Markol 87* 4% Polyamine A 1% sorbitan Mono-oleate | ↓ | | ↓ | | ↓ |
| 9 | 95% Markol 87* 4% Polyamine A 1% Sorbitan Mono-oleate | 59.2 wt. % tartaricacid ↓ | 8 g/l egg albumin ↓ | 7 ↓ | 5 g NaCl 4 g NaHCO$_3$ 1.5 g Al$_2$(SO$_4$)$_3$ 18 H$_2$O per liter | 2:1 ↓ |
| 10 | 96% Markol 87 4% Polyamine A | ↓ | ↓ | ↓ | | ↓ |

*White oil with viscosity of 17 cs at 100° F.

| | Shear Conditions | | | Trivalent Cation (Al) Characteristics | | | | |
|---|---|---|---|---|---|---|---|---|
| Ex | Shear Rate, 1/sec. | Shear Duration mass material sec./(100g) | Manner of Addition | Wt. Ratio L.C. Polymer Cation | Mole Ratio of Chelating Agent (Citrate) to Al | pH of Citrate/ Al Soln. | Stability (Degree of Coalescense) | Inspection Time |
| 1 | 378 | 133 | As citric Al soln. after LMC | 72/1 | 1/1 | 7 | Minimal Minimal | 3 months 21 months. |
| 2 | ↓ | ↓ | formed at Shear Rate of 27/sec. | 72/1 | ↓ | ↓ | Minimal Severe | 3 months 21 months |
| 3 | ↓ | ↓ | Plus continued | 32/1 | ↓ | 2 | Minimal | 10 min. |

TABLE I-continued

| | | | | | | | | |
|---|---|---|---|---|---|---|---|---|
| | ↓ | ↓ | shearing after citric Al soln | | ↓ | | Severe | 1 day |
| 4 | 76 | 8 | added at rate of 27/sec for 7300 sec./ 100g only for 2 | 178/1 | ↓ | 2 | Negligible | 1 Year |
| 5 | 3600 | 1.3 | Al add. in volume of water equal to that of suspending phase, after LMC formed at shear rate of 3600/sec. for 3 sec/100 g. | 19 | — | — | Negligible Severe | 1 day 2 weeks |
| 6 | 3600 | 10 | Al placed in suspending phase as powder before LMC formed | 76 | — | — | Minimal | 8 months |
| 7 | 378 | 133 | Al present in suspending phase with long chain polymer before LMC formed | 76/1 | — | — | Minimal | 1–4 days |
| 8 | ↓ | ↓ | | ↓ | — | — | Severe | 10 min. |
| 9 | ↓ | ↓ | | 61/1 | — | — | Minimal | 1–4 days |
| 10 | ↓ | ↓ | | ↓ | — | — | Severe | ½ hr. |

EXAMPLE 11

| | | |
|---|---|---|
| Emulsion: | 96% 1P17; 4% Polyamine(A) 59.2% tartaric acid prepared in colloid mill, 900 g of material circulating for 10 min., 85% open (Shear Rate 4000 sec$^{-1}$) | 100 g 75g |
| Suspending Phase: | 1.5 g Al$_2$(SO$_4$)$_3$ . 18H$_2$O 20 g NaHCO$_3$ 10 g sodium carboxymethyl cellulose (Matheson, Coleman & Bell) | per liter of water |

400 ml of suspending phase and 200 ml of emulsion were circulated in a colloid (J. W. Greer; Gifford Wood Model W200) at full power, 85% open setting to form the liquid membrane suspension. 270 ml of the suspension were combined with 225 ml of an albumin solution, 8 g albumin, 20 g NaHCO$_3$/liter H$_2$O and 10 mM bile and 0.5% pancreatin added. Extreme coalescence within five minutes of contacting with bile and pancreatin of reversibly coated (with methyl cellulose) liquid membranes compared to the irreversibly coated liquid membrane was observed. The remaining suspension stood in a container with no agitation for 5½ months at room temperature.

100 ml of the 5½ month old suspension (33 ml of liquid membrane capsules) and 500 ml of an albumin solution were combined in a beaker and pumped at 500 ml/min over a bed (5 cm diameter, 15 cm length) of glass beads for 48 hours. The beads were used to simulate other sorbent systems that might be used in a dialysate system. The suspension appeared to maintain is original appearance throughout the pumping procedure. No significant change in the size of the liquid membrane capsules occured after 2½ hours of pumping.

The pH of the suspending phase changed very little (from 8.16 to 7.06) over a 19 hour period indicating very little leakage of internal phase with this severe prolonged condition.

EXAMPLE 12

Emulsion: Same as Example 11

Suspending Phase: 20 g sodium carboxymethyl cellulose per liter water

Suspension was formed by stirring 30 ml of suspending phase and 15 ml of emulsion with a propeller (4 cm diameter, 3 blades tilted 45°) at 1800 RPM for one minute in a 5.5 cm diameter glass jar shear rate 400 sec$^{-1}$. A length of 18″ O.D. steel tubing in the jar served as a baffle. The distance between the propeller tip and baffle was 3 mm. The propeller speed was lowered to 132 RPM and 3 ml of a solution containing 0.608 g of citric acid and 3.2 g Al$_2$(SO$_4$)$_3$.18H$_2$O per 100 ml water added. The pH of the citric-aluminum solution was adjusted to 7.0 with NaOH before addition.

Figure 2:
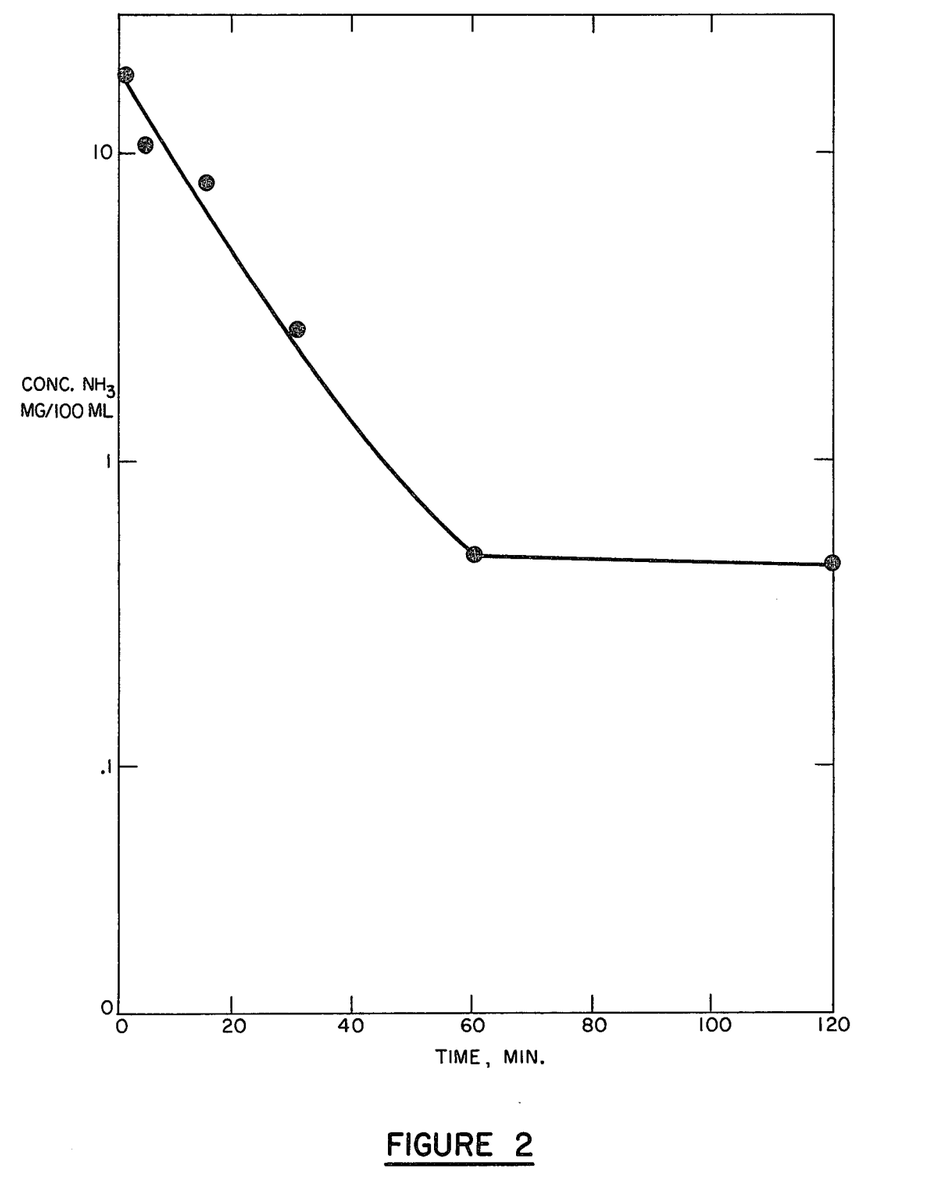
FIG. 2 shows ammonia removal by the liquid membranes of Example 12.

90 ml of the suspension were added to 270 ml of a solution containing 20 g/l NaHCO$_3$ and 20 mg/100 ml NH$_3$. FIG. 2 indicates the removal of ammonia with liquid membranes coated in the above manner. The rate constant of 0.31/min at a pH of 7.8 compares favorably with 0.40/min for a reversibly coated liquid membrane system.

What is claimed is:

1. An improved liquid membrane capsule resistant to coalescence, said capsule comprising a globule of an emulsion suspended in an aqueous suspending phase wherein said emulsion comprises discrete microdroplets of an aqueous interior phase surrounded by a continuous, nonaqueous, oil, exterior phase, wherein the improvement comprises an irreversible coating component comprising a long chain polymer possessing surface activity and the ability to gel or chain crosslink present in the aqueous suspending phase which forms an irreversible coating arround the oily, exterior phase of said capsule making same resistant to coalescence.

2. The composition of claim 1 wherein the irreversible coating component is selected from the group consisting of sodium carboxymethyl cellulose, hydroxypropyl cellulose, xanthum gum and albumin.

3. The composition of claim 1 wherein the amount of irreversible coating component in the aqueous suspension phase ranges from 0.5 to 100 grams irreversible coating component per liter suspension phase.

4. The composition of claim 1 wherein the improvement further comprises having in the aqueous suspension phase, in addition to the aqueous component and the irreversible coating component, a trivalent cation containing salt or a heavy metal divalent cation containing salt.

5. The composition of claim 4 wherein the salt is selected from the group consisting of $Al_2(SO_4)_3 \cdot 18H_2O$, aluminum acetate, aluminum hydroxide, trivalent and heavy divalent cation salt of copper, silver, iron, uranium, chromium, tin, lead, and zirconium.

6. The composition of claim 4 wherein the ratio of the irreversible coating component to the salt on a weight basis ranges from 50 to 999.

7. The composition of claim 1 wherein the amount of suspending phase to emulsion ranges from 1:1 to 5:1.

8. The composition of claim 4 wherein the amount of suspending phase to emulsion ranges from 1:1 to 5:1.

9. The composition of claim 1 wherein the irreversible coating component is sodium carboxymethyl cellulose.

10. The composition of claim 5 wherein the salt is $Al_2(SO_4)_3 \cdot 18H_2O$.

11. The composition of claim 5 wherein the irreversible coating component is sodium carboxymethyl cellulose and the salt is $Al_2(SO_4)_3 \cdot 18H_2O$.

12. A method for the preparation of liquid membrane capsules (LMC) which are resistant to coalescence, which comprises:
   (1) emulsifying an aqueous phase in a nonaqueous oil containing phase resulting in an emulsion,
   (2) suspending the water-in-oil of (1) as globules in an aqueous suspension phase comprising an aqueous component and an irreversible coating component which comprises a long chain polymer possessing surface activity and the ability to gel or chain crosslink wherein the suspending of the emulsion in the suspending phase is accomplished by shearing the emulsion in the suspending phase at a rate of from 50 to 8000 sec.$^{-1}$ for from 0.5 to 150 sec. per 100 grams total material and wherein said coating component forms an irreversible coating around said capsule making said resistant to coalescence.

13. The method of claim 12 wherein the irreversible coating component is selected from the group consisting of sodium carboxymethyl cellulose, hydroxypropyl cellulose, xanthum gum and albumin.

14. The method of claim 12 wherein the amount of irreversible coating component in the aqueous suspension phase ranges from 0.5 to 100 grams irreversible coating component per liter suspension phase.

15. The method of claim 12 further comprising the addition of trivalent cation containing salt or a heavy metal divalent cation containing salt to the aqueous suspension phase prior to the suspending of the emulsion in the aqueous suspension phase.

16. The method of claim 15 wherein the salt is selected from the group consisting of $Al_2(SO_4)_3 \cdot 18H_2O$, aluminum acetate, aluminum hydroxide, trivalent and heavy divalent cation salts of copper, silver, iron, uranium, chromium, tin, lead, and zirconium.

17. The method of claim 15 wherein the ratio of irreversible coating component to salt on a weight basis ranges from 50 to 999.

18. The method of claim 12 wherein the pH of the aqueous suspension phase is about 5.5 to about 8.0.

19. The method of claim 15 wherein the salt is a solid.

20. The method of claim 15 wherein the salt is an aqueous solution which is added dropwise to the aqueous suspension phase.

21. The method of claim 20 wherein the emulsion and the aqueous suspension phase comprising an aqueous component, an irreversible coating component and a salt component, are subject to a shear rate of from 4000 to 5000 sec.$^{-1}$ for from 0.8 to 1.3 sec. per 100 grams total material.

22. The method of claim 12 further comprising the addition of an acid solution of a trivalent cation containing salt or a heavy metal divalent cation containing salt to the suspension of (2) at a shear rate of 5–40 percent of that used in Step (2).

23. The method of claim 22 wherein the acid is citric acid, an alkali metal salt of citric acid or maleic acid, a short chain carboxylic acid or metal salt acid and the pH of the acid salt solution is adjusted to 2 to 7.

24. The method of claim 23 wherein the salt is $Al_2(SO_4)_3 \cdot 18H_2O$, and the acid is citric acid.

25. The method of claim 24 wherein the shear rate of Step (2) is 70–700 sec.$^{-1}$ for a duration of 1–150 sec. per 100 grams total material and the citric acid aluminum sulfate solution is added to the suspension of Step (2) at a shear rate of 5–40 percent of that used in Step (2).

26. The method of claim 23 wherein the mole ratio of acid to trivalent or heavy divalent cation salt ranges from 0:1 to 1:1.

27. The method of claim 24 wherein the mole ratio of citric acid to aluminum ranges from 6:1 to 1:1.

28. An improved hemodialysis process of the type wherein a stream of blood from a patient is passed over one side of a dialysis mambrane through which membrane toxins diffuse from the blood which toxins are picked up by a dialysis fluid on the other side of the membrane, the purified blood being returned to the patient, the improvement comprising suspending in the dialysis fluid the stabilized liquid membrane capsule system (LMC) of claim 1, 2, 3 or 4 wherein the interior phase of the LMC is citric acid, which removes ammonia from the dialysis fluid, passing this dialysis fluid and the suspended LMC over activated carbon and phosphate ion exchange materials to remove other toxins and recirculating the dialysis fluid and suspended LMC to the dialysis membrane, the use of the LMC reducing the volume of dialysis fluid embployed by about 99%.

29. An improved hemodialysis apparatus of the type wherein blood from a patient is passed over one side of a dialysis membrane through which membrane toxins diffuse from the blood, which toxins are picked up by a dialysis fluid on the other side of the membrane, the purified blood being returned to the patient, the improvement comprising suspending in the dialysis fluid the stabilized liquid membrane capsule system (LMC) of claim 1, 2, 3 or 4 wherein the interior phase of the LMC is citric acid, which removes ammonia from the dialysis fluid, means for passing the dialysis fluid and the suspended LMC over activated carbon and phosphate ion exchange materials which remove the converted ammonia and solids from the suspended LMC to the dialysis membrane, the LMC reducing the volume of dialysis fluid employed by about 99%.

30. An improved peritoneal dialysis process of the type wherein sterile saline is introduced into the peritoneal cavity, toxins from the blood diffuse through the peritoneal membrane lining the cavity and are adsorbed by the sterile saline and the toxin laden saline is withdrawn from the peritoneal cavity, discared and replaced by fresh sterile saline, the improvement comprising processing the toxin laden saline solution by contacting it with the stabilized liquid membrane capsule system (LMC) of claim 1, 2, 3 or 4 wherein the interior phase is citric acid, passing the combination over a bed of immobilized urease, activated carbon and phosphate exchange material which converts urea to ammonia and strips other toxins and solids from the saline, the LMC removing the ammonia, thereby cleansing the saline solution, separating the cleansed slaine solution from the LMC and recirculating the cleansed saline solution to the peritoneal cavity.

31. An apparatus for purifying the saline solution used in peritoneal dialysis which comprises means for contacting the toxin laden saline solution withdrawn from the body with the stabilized liquid membrane capsules (LMC) of claim 1, 2, 3 or 4 wherein the interior phase is citric acid, means for circulating the saline solution containing the LMC over a bed of immobilized urease, activated carbon and phosphate ion exchange material in a contacting zone wherein urea is converted to ammonia which is removed by the LMC, and other toxins are cleansed from the saline solution and the LMC whereby the cleansed saline is returned to the peritoneal cavity and the LMC are contacted with another volume of peritoneal saline for treatment.

32. An improved hemofiltration process of the type wherein blood from a patient is passed over one side of an ultrafiltration membrane wherein the side of the membrane opposite the blood contacting is maintained at a lower pressure than the contacting side resulting in passage through the membrane for an ultrafiltrate consisting essentially of plasma depleted in high molecular weight proteins but containing a substantial concentration of toxins, the improvement comprising rather than discarding the ultrafiltrate and replacing it with sterile saline, cleansing the ultrafiltrate by suspending in it the stabilized liquid membrane capsule systems (LMC) of claim 1, 2, 3 or 4 wherein the interior phase is citric acid, passing the ultrafiltrate and the suspended LMC over immobilized urease, activated carbon and phosphate ion exchange material which converts urea to ammonia, which is removed by the LMC and removes other toxins, separating the ultrafiltrate from the LMC and passing the ultrafiltrate back into the blood, the LMC being contacted with another volume of ultrafiltrate.

33. An improved hemofiltration apparatus of the type wherein blood from a patient is passed over one side of and ultrafiltration membrane wherein the side of the membrane opposite the blood contacting is maintained at a lower pressure than the contacting side, resulting in passage through the membrane of an ultrafiltrate consisting essentially of plasma depleted in high molecular weight proteins but containing a substantial concentration of toxins, the improvement comprising means for suspending in the ultrafiltrate the stabilized liquid membrane capsule systems (LMC) of claim 1, 2, 3 or 4 wherein the interior phase is citric acid, means for passing the ultrafiltrate and the suspended LMC over immobilized urease, activated carbon and phosphate ion exchange material in a contacting zone wherein urea is converted to ammonia which is removed by the LMC and other toxins are cleansed from the ultrafiltrate, means for separating the cleansed ultrafiltrate and LMC discharged from the contacting zone and means to returning the cleansed ultrafiltrate into the blood, the LMC being contacted with another volume of ultrafiltrate.

* * * * *